(No Model.)

C. BEHRINGER.
VEHICLE WHEEL.

No. 358,531. Patented Mar. 1, 1887.

Witnesses
Geo. W. Young.
Geo. W. Campbell

Inventor
Charles Behringer
By his Attorneys
Jannus and Skinkle ated March 1, 1887.

UNITED STATES PATENT OFFICE.

CHARLES BEHRINGER, OF DEFIANCE, OHIO.

VEHICLE-WHEEL.

SPECIFICATION forming part of Letters Patent No. 358,531, dated March 1, 1887.

Application filed August 3, 1886. Serial No. 209,898. (No model.)

*To all whom it may concern:*

Be it known that I, CHARLES BEHRINGER, a citizen of the United States, residing at Defiance, in the county of Defiance, State of Ohio, have invented certain new and useful Improvements in Vehicle-Wheels, of which the following is a description.

My improvements relate to metallic vehicle-wheels; and they consist in such an improved form of hub and the method of attaching the spokes thereto as to make a cheap, strong, and durable wheel, in which the spokes are so supported by the hub that they will not be liable to break off across the screw-threads at their inner ends.

Figure 2:
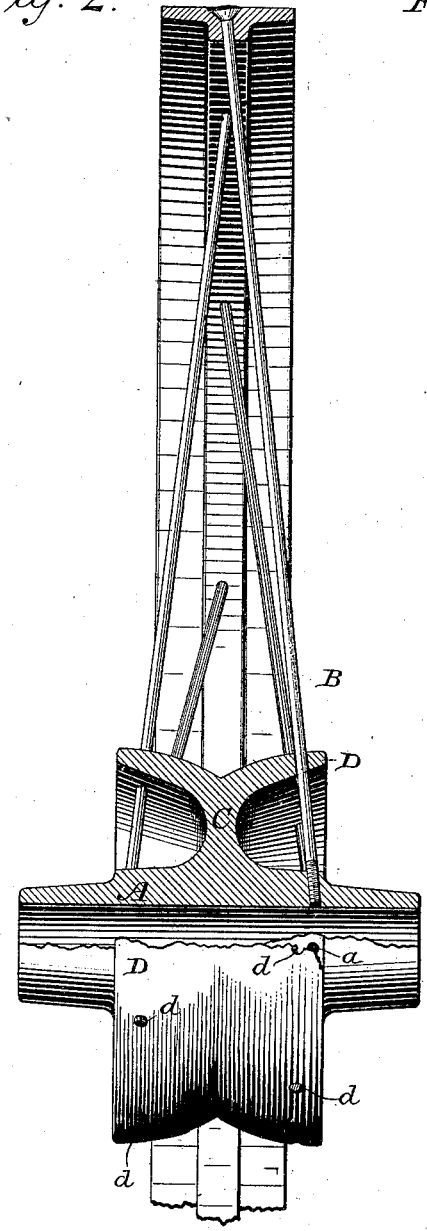
Figure 1:
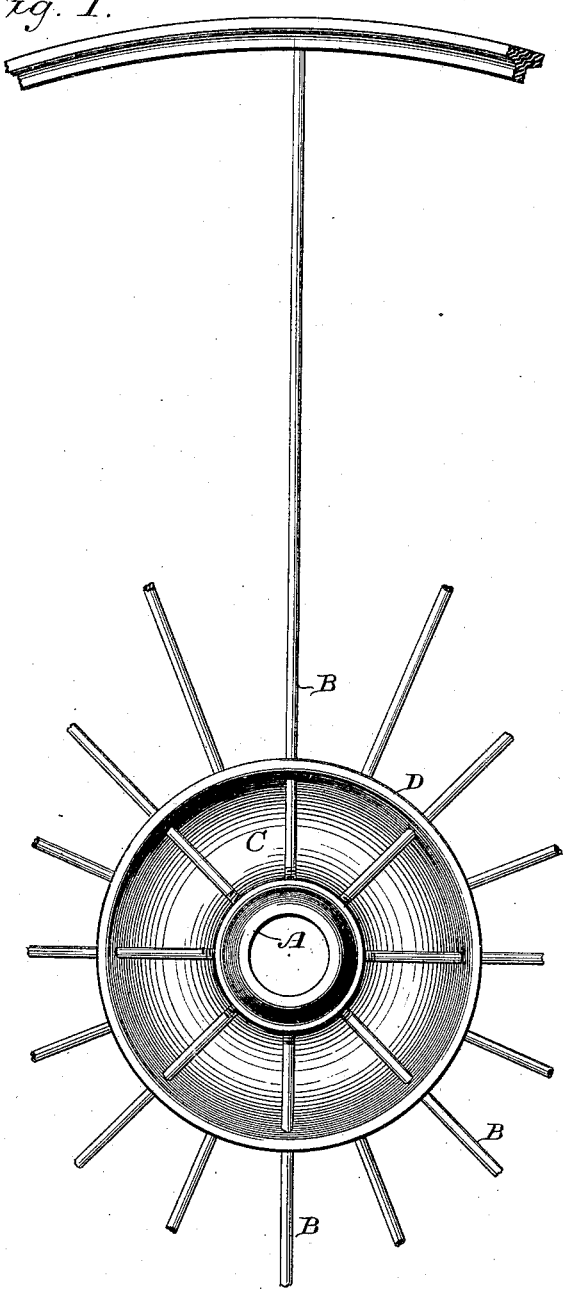

In the accompanying drawings, Figure 1 is a side elevation of a portion of a wheel embodying my invention, and Fig. 2 is a view partly in elevation and partly in central transverse section therethrough.

The hub consists of a single piece of solid cast metal, and is formed with the usual sleeve or cylinder, A, bored to fit the axle. As usual in this class of wheels, the spokes are alternately attached to the hub on lines at either side of its transverse center, and rather wide apart, to give it greater strength and rigidity, as is well understood. At suitable intervals screw-threaded sockets *a* are formed in the sleeve on these lines for the reception of the correspondingly-threaded ends of the spokes B, the sleeve being increased in diameter or thickness to give the requisite depth to the spoke-sockets. The screw-threads on the spokes cutting deeply into their diameter weakens them materially and makes them liable to break short off near the hub when subjected to the transverse and twisting strains of ordinary usage. In order, therefore, to protect them against these strains at this point, I form on the hub, between the lines of spokes, an annular rib or web, C, having at its outer edge side projecting flanges, D, through apertures *d*, in which the spokes pass and snugly fit. These flanges, embracing the spokes as they do, protect them fully at their threaded ends from any but direct tensile strains, which they may be fully strong enough to resist, while too weak to stand bad twists and transverse strains. I am thus enabled to use very light spokes, and to make light but at the same time a very strong and cheap wheel.

The spokes may be fastened into the rim in any suitable manner. In the drawings I show a rim having perforations countersunk on the outside, the spokes being provided with conical heads which fit into the countersunk recesses, and permit them to be turned when being screwed into the hub.

What I claim is—

1. A wheel having a solid cast-metal hub provided with screw-threaded sockets for the reception of screw-threaded spokes and perforated annular flanges through the perforations in which the spokes pass, said spokes being supported by said flanges between their point of attachment to the hub and the rim, substantially as described.

2. A wheel having a solid cast-metal hub formed with re-enforced or thickened central portion, and having screw-threaded spoke-sockets in said thickened portion, and flanges extending from the central portion of the hub, said flanges being provided with perforations through which the spokes pass and in which they are additionally supported between their screw-threaded sockets and the rim, substantially as described.

In testimony whereof I hereto affix my signature in presence of two witnesses.

CHAS. BEHRINGER.

Witnesses:
NORAH CARPENTER,
B. F. ENOS.